Figure 1:
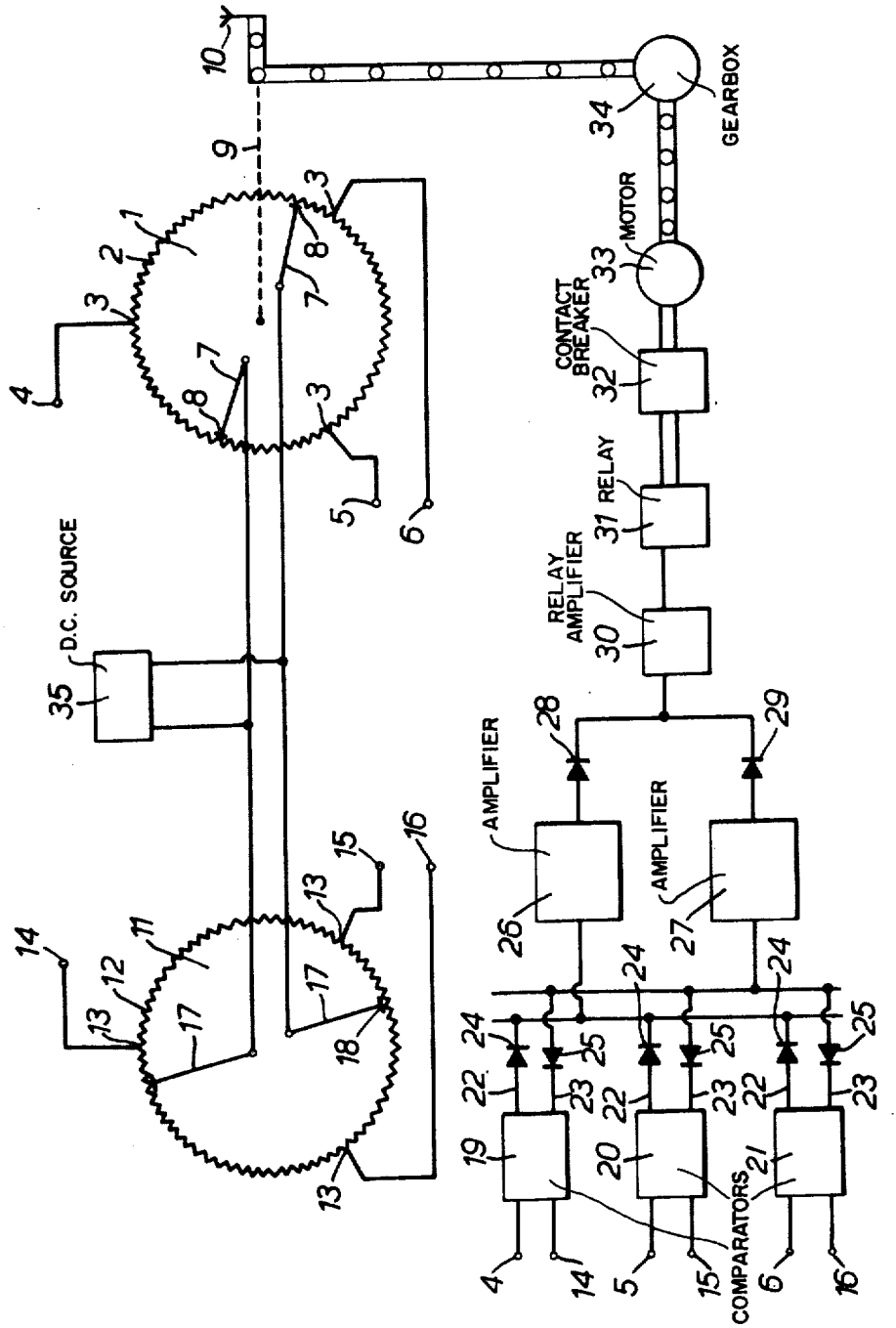

United States Patent [19]
Baxter

[11] 4,054,825
[45] Oct. 18, 1977

[54] CONTROL ARRANGEMENTS

[75] Inventor: Roderick Carey Baxter, Chelmsford, England

[73] Assignee: The Marconi Company Limited, England

[21] Appl. No.: 556,943

[22] Filed: Mar. 10, 1975

[30] Foreign Application Priority Data

Mar. 14, 1974 United Kingdom .............. 11484/74

[51] Int. Cl.² ............................................... G05B 1/06
[52] U.S. Cl. ................................... 318/663; 318/674; 318/675
[58] Field of Search ....................... 318/663, 674, 675

[56] References Cited
U.S. PATENT DOCUMENTS

| 2,294,210 | 8/1942 | Roters | 318/663 |
| 2,454,184 | 11/1948 | Kliever | 318/663 X |
| 2,538,415 | 1/1951 | Ergen | 318/663 |
| 2,938,154 | 5/1960 | Kirschbaum | 318/663 |
| 3,628,121 | 12/1971 | Diprose | 318/663 X |
| 3,697,849 | 10/1972 | Uchida | 318/663 X |
| 3,915,325 | 10/1975 | Lark | 318/674 X |
| Re. 26,404 | 6/1968 | Lunn et al. | 318/663 X |

Primary Examiner—B. Dobeck
Attorney, Agent, or Firm—Diller, Brown, Ramik & Wight

[57] ABSTRACT

A control arrangement is described for angularly positioning a member such as an aerial structure in which a potentiometer has a continuous circumferential winding with two sets of tappings of at least two tappings and at least three tappings respectively the relative angular position of the two sets of tappings being variable in dependence upon the angular position of the member. Potentials are applied to one set of tappings and the potentials at the other set are compared with respective ones of a set of preset voltages representative of the desired position of the member. The member is driven to change its angular position until the result of comparison indicates that the desired position has been reached.

16 Claims, 2 Drawing Figures

CONTROL ARRANGEMENTS

This invention relates to control arrangements and is particularly, although not exclusively applicable to such arrangements in which it is required to set an aerial structure to a desired predetermined position.

A known control system utilises A.C. servo-motors and position control devices known as synchros. A synchro is similar to an A.C. motor and one known form of synchro comprises a stator winding consisting of three windings connected in "star" configuration and a rotor winding. If an alternating voltage is applied across the rotor winding a voltage will be induced across each winding of the stator, the voltage induced in respective windings depending upon the angular position of the rotor.

When used in a position control arrangement two synchros are frequently used, one known as the "Transmitter" synchro and the other the "Receiver" synchro. Respective windings of the two synchros are connected directly together and an alternating voltage applied across the rotor winding of the "Transmitter" synchro. A voltage will be induced across the rotor of the "Receiving" synchro indicative of its angular position which voltage will be zero when the rotors of the synchros are aligned. Further information regarding synchro systems may be obtained from "Synchro Engineering Handbook" by Upson and Batchelor published by Muirhead and Company Limited.

In a possible system for positioning an aerial structure, the rotating structure may be driven by a servo motor which in turn is driven by the amplified output voltage from the rotor of the "Receiving" synchro. The "Transmitting" synchro utilised to indicate the desired positional setting is usually located in a building in close proximity to the aerial structure so that the windings which are connected together experience substantially identical voltages thereby ensuring accurate positioned control.

When such a control arrangement is required to be used in an unmanned installation where the aerial site may be many miles from a control station, it becomes impractical to effect interconnection of the stator windings of the two synchros due to the effects of the considerable resistance of the connecting lines. The relative voltages of the phases on the three interconnecting lines may be altered and noise may develop both of which may reduce the possibility of obtaining an accurate indication of when the voltage across the rotor of the receiving synchro falls to zero. It therefore becomes necessary to maintain the "Transmitting" synchro in close proximity to the "Receiving" synchro and to set the desired position of the rotor by remote control possibly over a microwave link or land link.

Such an arrangement does not readily lend itself to operation of this kind in view of the difficulty of setting the rotor of the "Transmitter" synchro to the position indicated at the distant terminal. The rotor must be driven to the desired position by a further servo control system responsive to the signals transmitted from the distant site and this of necessity considerably increases the overall cost and complexity of the arrangement.

This invention seeks to provide a control arrangement in which the above mentioned disadvantages are mitigated.

According to this invention there is provided a control arrangement for angularly positioning a member comprising a first potentiometer having a continuous circumferential winding with two sets of tappings which include at least two tappings and at least three tappings respectively, whose relative angular position is variable in dependence upon the angular position of said member; means for applying predetermined potentials to one set of tappings, and means for deriving an error signal indicative of deviation of the member from a desired angular position by comparing each of the said voltages at the other set of tappings with respective ones of a set of preset voltages representative of the desired position of the member.

Advantageously the predetermined potentials are D.C. potentials.

Preferably the two sets of tappings include two tappings and three tappings respectively.

Conveniently the three tappings are equally spaced around the circumference of the continuous winding.

Preferably the two tappings are provided by means of a potentiometer rotor arranged to contact the continuous winding at two points around the circumference of the winding.

Conveniently the angular separation of the two contact points of the rotor with the continuous winding is 180°.

In operation the member to be positioned is coupled to the rotor, the angular position of which is arranged to be representative of the angular position of the member.

Advantageously the predetermined potentials are applied to the two tappings provided by the rotor. The set of preset voltages representative of the desired angular position of the member may be derived by potential divider means connected across fixed voltage supplies.

Said potential divider means may comprise a second potentiometer having a continuous circumferential winding, means for applying the same predetermined potentials as are applied to said one set of tappings of said first potentiometer, to respective positions on the continuous circumferential winding of the second potentiometer, representative of the desired position of the member, and defining a first set of tappings and means for deriving from a second set of tappings said preset voltages.

The first set of tappings on the winding of the second potentiometer may be defined by means of a potentiometer rotor arranged to contact the winding, and whose angular position is representative of the desired angular position of the member.

However it is often convenient to define the first set of tappings on the winding of the second potentiometer by switch means arranged to apply the potentials to the winding at selected ones of a number of predetermined tapping points, the points selected depending upon the desired angular position of the member.

Alternatively the potential divider means may comprise a circumferential chain of discrete resistors each junction between neighbouring resistors defining one of a plurality of tapping points, switch means for applying to a first set of said plurality of tapping points, respective ones of the same predetermined potentials as applied to said one set of tapping points of the first potentiometer and means for deriving from a second set of said plurality of tapping points said set of preset voltages, respective positions in the circumferential chain of the tapping points of the first set of said plurality being representative of the desired angular position of the member.

Conveniently each of the voltages at the other set of tappings of the first potentiometer and respective ones of the preset voltages are fed as two inputs to a respective one of a number of comparators each arranged to provide an output of a polarity dependent upon the relative magnitude of the two input voltages and zero output when the magnitude of the input voltages are equal.

Advantageously the comparator output voltages are utilised to maintain supply voltage to a motor arranged to adjust the position of the member, said supply voltage being interrupted to stop the motor when the output voltages of the comparators simultaneously fall to zero.

Figure 2:
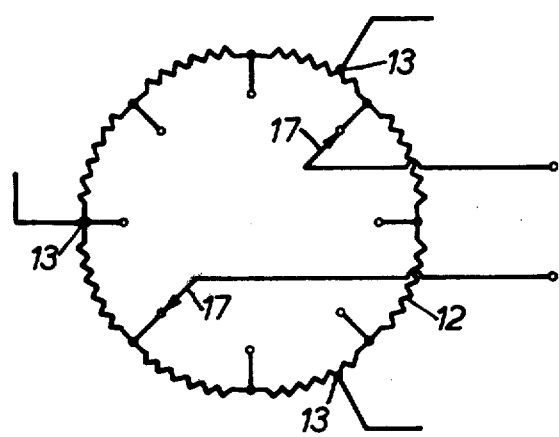

This invention will now be further described with reference to the accompanying drawing in which FIG. 1 very schematically illustrates a control arrangement in accordance with this invention and FIG. 2 illustrates a modified form of potentiometer.

Referring to the FIG. 1 there is shown a first potentiometer generally designated 1 having a continuous circumferential stator winding 2. The winding 2 is provided with three tappings 3 constituting said other set of tappings, which are connected to respective terminals 4, 5 and 6. The potentiometer also has a rotor 7 which contacts the winding 2 at two diammetrically opposed tapping points 8 which constitute said one set of tappings. The rotor 7 is geared, as indicated by dashed line 9, with a one to one ratio with an aerial schematically shown at 10, whose angular position is to be controlled. The above described potentiometer is commercially available under the trade name "Desynn."

A second potentiometer 11, identical to the potentiometer 1 is provided and has a continuous winding 12 with tappings 13 at positions which correspond to the tappings 3 on the winding 2 of the potentiometer 1, and which are connected to respective terminals 14, 15 and 16. The potentiometer 11 has a rotor 17, which contacts the winding 12 at two diammetrically opposed tapping points 18.

The terminals 4 and 14 which are connected to corresponding tappings on the windings 2 and 12 of the two potentiometers 1 and 11 are connected as indicated in the drawing to respective inputs of a comparator 19. In similar manner the terminals 5 and 15 provide respective inputs for a comparator 20 and the terminals 6 and 16 similar inputs for a comparator 21. Each comparator 19, 20, 21 provides an output voltage on one of two lines 22, 23 depending upon which input is of greater magnitude and provides zero output voltage if the two input voltages are equal.

The outputs on lines 22 are added by diodes 24 to provide a common output which is connected to the input of an amplifier 26. In similar manner diodes 25 add the comparator outputs on lines 23 and feed a common output voltage to inverting amplifier 27. The outputs of amplifiers 26 and 27 are fed respectively via reverse voltage protection diodes 28 and 29 to a relay amplifier 30 the output of which is connected to a relay 31 which is connected to open a contact breaker 32. The contact breaker 32 provides supply voltage for a motor 33 which is coupled via a high ratio gearbox 34 to the serial structure 10.

In operation a D.C. power supply 35 is arranged to provide a D.C. voltage which is simultaneously applied across tappings 8 made by the rotor 7 on the winding 2 of the potentiometer 1 and across the tappings 18 by the rotor 17 on the winding 12 of the potentiometer 11. The rotor 17 of the potentiometer 11 is turned until it lies in the direction in which it is desired to position the aerial 10 via the gearbox 34.

The voltage applied by the supply 35 between the diammetrically opposed contact points 18 on the winding 12 will be transformed by potential divider action into a set of voltages at the terminals 14, 15 and 16 which are representative of the angular position of the rotor 17 and therefore of the desired angular setting of the aerial 10.

In similar manner the voltages at terminals 4, 5 and 6 are representative of the angular position of rotor 7 and hence the actual instantaneous angular position of the aerial 10. As the aerial 10 and hence the rotor 7 are rotated by the motor 33, the voltages at the terminals 4, 5 and 6 will change.

In view of the symmetry of the potentiometers 1 and 11, there will be three positions of the rotor 7, for a given setting of the rotor 17 in which the voltage at terminal 4 equals the voltage at the terminal 14 and similarly three positions in which the voltages at the terminals 5 and 15 are equal and three positions in which the voltages at the terminals 6 and 16 are equal. There will however only be one unique position, namely exact correspondence of the angular positions of the rotors 7 and 17, in which the voltages at corresponding terminals e.g. 4, 14; 5, 15; and 6, 16 are simultaneously equal to one another.

In view of this and since the outputs 22 of the three comparators 19, 20, 21 are added and fed to the amplifier 26 and in similar manner the outputs 23 are added and fed to the amplifier 27, one or other of the two amplifiers 26 and 27 will always receive an input voltage unless all three comparators simultaneously provide zero output voltage on outputs 22 and 23. In other words unless the two rotors 7 and 17 are in corresponding alignment. When this position is reached neither amplifier 26 nor 27 will provide an output voltage to the relay amplifier 30. The voltage supplied by the amplifier 30 to the relay 31 will be removed and relay 31 will open and consequently cause the circuit breaker 32 to open thereby removing supply voltage from the motor 33 which will stop after one or two revolutions. Since these extra revolutions are transmitted to the aerial 10 via a high ratio gearbox 34, the aerial 10 will negligibly overshoot the desired position.

The above described procedure is repeated for any desired change in position of the aerial.

Although the embodiment of the invention described in the Drawing utilised, for the potentiometer 11, a "Desynn" potentiometer identical to the potentiometer 1, any method of generating a set of voltages for comparison, which are representative of a desired aerial setting, may be used.

For example the rotor 17 may be replaced by a set of relay type switches which connect the voltage provided by the power supply 35 to diammetrically opposed predetermined tapping points around the circumference of the continuous winding 12, the voltages at tapping points 13 once again providing the three reference voltages.

As shown alternatively in FIG. 2 the continuous winding 12 may be replaced by a circumferential chain of discrete resistors 36, 38, 40, 42, 44, 46, 48 and 50, the junction points between neighbouring resistors forming predetermined tapping points 52, 54, 56, 58, 60, 62, 64 and 66, relay switches once again being used to connect the voltage from the supply 35 between two such points and three further tapping points 68, 70 and 72 similar to points 13 being provided by the resistor chain for supplying the preset voltages.

Both of the above two examples using relay switches are particularly suitable for use in a system in which the desired aerial position is set by remote control. In such a case digital signals are transmitted, and are utilised at the aerial site to operate the relay switches to set up the preset voltages representative of the desired position.

Since the voltages are derived by potential divider action no furher servo system is required to respond to the transmitted digital signals as would be required in the prior art arrangements utilising synchros and A.C. voltages, the transmitted signals being required merely to open or close appropriate switches.

Although the arrangement described utilises a potentiometer 1 having three stationary tappings 3 and two further tappings 8 provided by the rotor 7, the two sets of tappings being rotatable relative to one another, it is equally possible to provide more than two or three tappings respectively. It is also possible to apply potentials from the supply 35 to the tappings 3 and 13 in the two potentiometers 1 and 11 respectively and to compare the voltages developed across the two rotors.

Although for ease of accurate relatively noise free comparison, D.C. supply voltage is preferred, the remote control advantages of the invention can be equally well obtained using A.C. supply voltage and A.C. comparators.

I claim:

1. A control arrangement for angularly positioning a member comprising a first potentiometer having a continuous circumferential winding with two sets of tappings which include at least two tappings and at least three tappings respectively, whose relative angular position is variable in dependence upon the angular position of said member; means for applying predetermined potentials to one set of tappings whereby a unique set of potentials is established at the other set of tappings for each angular position of said member, means for generating a selected set of potentials corresponding to one unique set of potentials established at said other set of tappings when said member is in a particular angular position, and means connected to said other set of tappings and to said means for generating an error signal indicative of deviation of the member from said particular angular position including means for comparing each of the said voltages at the other set of tappings with respective ones of said selected set of potentials.

2. A control arrangement as claimed in claim 1 in which the predetermined potentials are D.C. potentials.

3. A control arrangement as claimed in claim 1 in which the two sets of tappings include two tappings and three tappings respectively.

4. A control arrangement as claimed in claim 3 in which the three tappings are equally spaced around the circumference of the continuous winding.

5. A control arrangement as claimed in claim 3 in which the two tappings are provided by means of a potentiometer rotor arranged to contact the continuous winding at two points around the circumference of the winding.

6. A control arrangement as claimed in claim 5 in which the angular separation of the two contact points of the rotor with the continuous winding is 180°.

7. A control arrangement as claimed in claim 5 wherein in operation the member to be positioned is coupled to the rotor, the angular position of which is arranged to be representative of the angular position of the member.

8. A control arrangement as claimed in claim 5 in which the predetermined potentials are applied to the two tappings provided by the rotor.

9. A control arrangement as claimed in claim 1 in which the set of preset voltages representative of the desired angular position of the member is derived by potential divider means connected across fixed voltage supplies.

10. A control arrangement as claimed in claim 9 in which the said potential divider means comprises a second potentiometer having a continuous circumferential winding, means for applying the same predetermined potentials as are applied to said one set of tappings of said first potentiometer, to respective positions on the continuous circumferential winding of the second potentiometer, representative of the desired position of the member, and defining a first set of tappings and means for deriving from a second set of tappings said preset voltages.

11. A control arrangement as claimed in claim 10 in which the first set of tappings on the winding of the second potentiometer is defined by means of a potentiometer rotor arranged to contact the winding, and whose angular positions is representative of the desired angular position of the member.

12. A control arrangement as claimed in claim 10 in which the first set of tappings on the winding of the second potentiometer is defined by switch means arranged to apply the potentials to the winding at selected ones of a number of predetermined tapping points, the points selected depending upon the desired angular position of the member.

13. A control arrangement as claimed in claim 9 in which the potential divider means comprises a circumferential chain of discrete resistors each junction between neighbouring resistors defining one of a plurality of tapping points, switch means for applying to a first set of said plurality of tapping points, respective ones of the same predetermined potentials as applied to said one set of tapping points of the first potentiometer and means for deriving from a second set of said plurality of tapping points said set of preset voltages, respective positions in the circumferential chain of the tapping points of the first set of said plurality being representative of the desired angular position of the member.

14. A control arrangement as claimed in claim 1 in which each of the voltages at the other set of tappings of the first potentiometer and respective ones of the preset voltages are fed as two inputs to a respective one of a number of comparators each arranged to provide an output of a polarity dependent upon the relative magnitude of the two input voltages and zero output when the magnitude of the input voltages are equal.

15. A control arrangement as claimed in claim 14 in which the comparator output voltages are utilised to maintain supply voltage to a motor arranged to adjust the position of the member, said supply voltage being interrupted to stop the motor when the output voltages of the comparators simultaneously fall to zero.

16. A control arrangement for angularly positioning a member, comprising in combination:
 a potentiometer having a continuous circumferential resistance member;
 a first set of tappings connected for rotation in fixed relation with said member and slidably contacting said resistance member;

a second set of tappings contacting said resistance member at fixed, circumferentially spaced points thereof;

means connected to one set of tappings for applying fixed predetermined potentials thereto, the circumferential spacing of said first set of tappings and the circumferential spacing of said second set of tappings being such that said predetermined potentials applied to said one set of tappings establishes a unique set of potentials at the other set of tappings for every angular position of said member;

means for generating a selected set of potentials corresponding to one unique set of potentials established at said other set of tappings by a particular angular position of said member;

comparator means connected to said other set of tappings and to said selected set of potentials for creating on error signal so long as the unique set of potentials at said other set of tappings does not correspond to said one unique set of potentials; and means for rotating said member in response to said error signal.

* * * * *